United States Patent
Matsuda

(10) Patent No.: US 9,238,495 B2
(45) Date of Patent: Jan. 19, 2016

(54) STRADDLE ELECTRIC VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/369,178

(22) PCT Filed: Dec. 28, 2011

(86) PCT No.: PCT/JP2011/007329
§ 371 (c)(1),
(2), (4) Date: Jun. 26, 2014

(87) PCT Pub. No.: WO2013/098890
PCT Pub. Date: Jul. 4, 2013

(65) Prior Publication Data
US 2014/0339008 A1 Nov. 20, 2014

(51) Int. Cl.
B62D 61/02 (2006.01)
B62K 11/02 (2006.01)
B62K 11/04 (2006.01)
B60L 3/00 (2006.01)
B60L 11/18 (2006.01)

(52) U.S. Cl.
CPC .............. *B62K 11/02* (2013.01); *B60L 3/0046* (2013.01); *B60L 11/1803* (2013.01); *B60L 11/1877* (2013.01); *B60L 11/1879* (2013.01); *B62K 11/04* (2013.01); *B60L 2240/36* (2013.01); *B62K 2204/00* (2013.01); *B62K 2208/00* (2013.01); *Y02T 10/705* (2013.01); *Y02T 10/7005* (2013.01)

(58) Field of Classification Search
CPC ....................... B62K 2204/00; B62K 2208/00
USPC ......................................... 180/220; 280/281.1
See application file for complete search history.

(56) References Cited

U.S. PATENT DOCUMENTS

| 4,139,072 A | * | 2/1979 | Dawson ......................... 180/312 |
| 5,248,012 A | * | 9/1993 | Kurawaki et al. ............. 180/219 |
| 5,421,427 A | * | 6/1995 | Ogawa et al. ................. 180/220 |
| 5,477,936 A |   | 12/1995 | Sugioka et al. |
| 5,931,245 A | * | 8/1999 | Uetake et al. ................. 180/65.8 |

(Continued)

FOREIGN PATENT DOCUMENTS

| CN | 2637305 Y | 9/2004 |
| EP | 2210803 A2 | 7/2010 |
| JP | 2004210074 A | 7/2004 |

OTHER PUBLICATIONS

European Patent Office, Extended European Search Report of EP11878950.2, Jul. 31, 2015, Germany, 6 pages.

*Primary Examiner* — Joseph Rocca
*Assistant Examiner* — Marlon Arce
(74) *Attorney, Agent, or Firm* — Alleman Hall McCoy Russell & Tuttle LLP

(57) ABSTRACT

A straddle electric vehicle includes a battery unit which is an electric power supply for an electric motor; a vehicle body frame including a main frame unitarily joined to a head pipe; and a sub-frame extending rearward from an upper portion of the main frame. The main frame includes a down frame member extending downward from the head pipe and a lower frame member extending rearward from a lower end of the down frame member, and the sub-frame is detachably joined to the vehicle body frame. A bottom portion of the battery unit is supported on the lower frame member of the main frame, and a side portion of the battery unit is covered with the sub-frame.

12 Claims, 4 Drawing Sheets

(56) References Cited

U.S. PATENT DOCUMENTS

| | | | |
|---|---|---|---|
| 7,117,966 B2* | 10/2006 | Kohda et al. | 180/68.5 |
| 8,413,758 B2* | 4/2013 | Shiina et al. | 180/311 |
| 8,636,092 B2* | 1/2014 | Kawatani | 180/68.5 |
| 8,905,170 B2* | 12/2014 | Kyoden et al. | 180/68.5 |
| 8,973,689 B2* | 3/2015 | Plazotta et al. | 180/65.1 |
| 2005/0092538 A1 | 5/2005 | Baldwin et al. | |
| 2008/0093146 A1* | 4/2008 | Kobayashi | 180/219 |
| 2010/0133030 A1* | 6/2010 | Johnson et al. | 180/68.5 |
| 2012/0103706 A1* | 5/2012 | Kondo et al. | 180/65.1 |
| 2012/0111651 A1* | 5/2012 | Irie et al. | 180/65.1 |

* cited by examiner

STRADDLE ELECTRIC VEHICLE

TECHNICAL FIELD

The present invention relates to a straddle electric vehicle which drives by use of driving power generated by an electric motor.

BACKGROUND ART

In recent years, a straddle electric vehicle which incorporates as a driving power source an electric motor activated by electric energy stored in a battery has been developed. As a conventional example of a structure for mounting the battery in the straddle electric vehicle, it is proposed that the battery is fastened to the side surface of a main frame (see e.g., Patent Literature 1).

CITATION LIST

Patent Literature

Patent Literature 1: Japanese Laid-Open Patent Application Publication No. 2004-210074

SUMMARY OF INVENTION

Technical Problem

However, a battery with a heavy weight applies a great load to members used for fastening the battery to the main frame. Because of this, there is a need for a large structure for stably supporting the battery in the vicinity of the main frame and the battery.

In a case where the main frame is composed of a pair of right and left main frames, it is necessary to insert the battery into a space between the right and left main frames from above or from below to mount the battery in the vehicle. Moving the battery with a heavy weight in a vertical direction is a complicated work. In addition, the width of the battery is restricted by a spacing between the main frames. Under the circumstances, it is not easy to increase the capacity of the battery.

Accordingly, an object of the present invention is to provide a straddle electric vehicle wherein the capacity of the battery can be easily increased and a battery with a large size can be easily mounted.

Solution to Problem

The present invention has been made to attain the above described object. According to the present invention, there is provided a straddle electric vehicle which drives by use of driving power generated by an electric motor, the straddle electric vehicle comprising: a battery unit which is an electric power supply for the electric motor; a vehicle body frame including a head pipe supporting a steering shaft for steering a front wheel such that the steering shaft is rotatable, and a main frame unitarily joined to the head pipe; and a sub-frame extending rearward from an upper portion of the main frame; wherein the main frame includes a down frame member extending downward from the head pipe and a lower frame member extending rearward from a lower end of the down frame member, and the sub-frame is detachably joined to the vehicle body frame; and wherein a bottom portion of the battery unit is supported on the lower frame member of the main frame, and a side portion of the battery unit is covered with the sub-frame.

In accordance with this configuration, by merely placing the battery unit on the lower frame member in a state in which the sub-frame is detached, the battery unit can be mounted in the vehicle. Since it is not necessary to raise the battery unit to a high position, the battery unit can be easily mounted in the vehicle. Thereafter, by mounting the sub-frame, the side portion of the battery unit can be covered with the sub-frame. This allows the battery unit to be suitably protected. As can be seen from this procedure, the width of the battery unit is not restricted by the dimension of the sub-frame except for the portion of the battery unit which is covered with the sub-frame. Therefore, the capacity of the battery unit can be easily increased in the locations above and below the portion of the battery unit which is covered with the sub-frame.

At a minimum, the lower frame member of the main frame may be composed of a pair of right and left lower frame members; and the bottom portion of the battery unit may be supported on the pair of right and left lower frame members.

In accordance with this configuration, since the lower frame member is composed of the pair of right and left lower frame members, the battery unit can be stably supported thereon.

The down frame member may be placed forward relative to the battery unit.

In accordance with this configuration, the battery unit can be protected by the down frame member.

The main frame may include a pair of right and left main frames, and the sub-frame may include a pair of right and left sub-frames; and the right and left sub-frames may be detachably joined to the right and left main frames facing the right and left sub-frames, respectively.

In accordance with this configuration, since the right and left sub-frames are joined to the right and left main-frames, respectively, the length of the sub-frame can be made shorter than in a case where the sub-frame is joined to the head pipe. In addition, since the pair of sub-frames cover the side portions of the battery case, the battery case can be protected more effectively.

The straddle electric vehicle may comprise a swing arm supporting a rear wheel such that the rear wheel is rotatable; and a swing arm bracket coupled to the swing arm such that the swing arm is pivotable; and the lower frame member and the sub-frame may be detachably joined to the swing arm bracket.

In accordance with this configuration, the swing arm and the rear wheel are easily mounted to the vehicle body frame.

The straddle electric vehicle may comprise: a motor case accommodating the electric motor; the swing arm bracket may be formed by at least a portion of the motor case; and a rear end portion of the lower frame member and a rear end portion of the sub-frame may be detachably joined to the motor case.

In accordance with this configuration, since the motor case can be utilized as a portion of the swing arm bracket, the number of components can be reduced.

The straddle electric vehicle may comprise: a transmission for changing a speed of a rotation of the electric motor; the motor case may accommodate the transmission and the electric motor; and the electric motor and the transmission may be arranged vertically.

In accordance with this configuration, the motor case accommodating the transmission and the electric motor is mounted in the vehicle such that the motor case extends vertically. This allows the rear end portion of the lower frame member and the rear end portion of the sub-frame to be vertically distant from each other. Therefore, the length of the sub-frame or the lower frame member can be reduced.

The lower frame member may be located below a pivot around which the swing arm is pivoted with respect to the swing arm bracket.

In accordance with this configuration, it is not necessary to raise the battery to a high position when the battery is mounted in the vehicle. Therefore, the battery can be easily mounted in the vehicle.

Advantageous Effects of Invention

As should be appreciated from the foregoing, in accordance with the present invention, it is possible to provide a straddle electric vehicle which can easily increase the capacity of the battery, and can easily incorporate the battery with a large size. The above and further objects, features and advantages of the present invention will more fully be apparent from the following detailed description of preferred embodiments with accompanying drawings.

DESCRIPTION OF EMBODIMENTS

Hereinafter, embodiments of the present invention will be described with reference to the accompanying drawings. Throughout the drawings, the same or corresponding components are designated by the same reference symbols and will not be described in repetition in detail. The stated directions are referenced from the perspective of a rider riding on an electric motorcycle which is an exemplary straddle electric vehicle according to the embodiment of the present invention.

Figure 1:
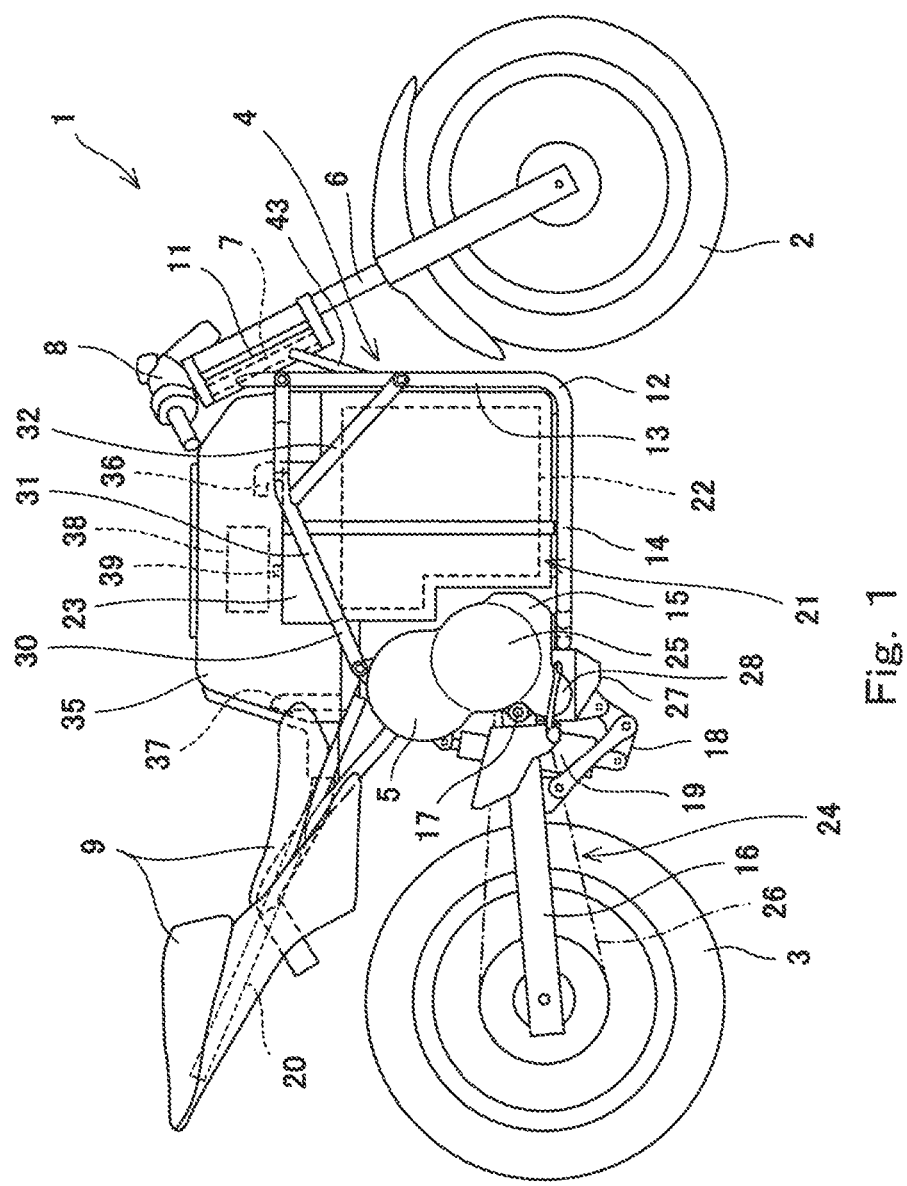
FIG. 1 is a right side view of an electric motorcycle which is an exemplary straddle electric vehicle according to Embodiment 1 of the present invention.

FIG. 1 is a right side view of an electric motorcycle 1 which is an exemplary straddle electric vehicle according to Embodiment 1 of the present invention. As shown in FIG. 1, the electric motorcycle 1 includes a front wheel 2 which is a driven wheel, a rear wheel 3 which is a drive wheel, a vehicle body frame 4 disposed between the front wheel 2 and the rear wheel 3, and an electric motor 5 which is a driving power source for moving the electric motorcycle 1. The electric motorcycle 1 of the present embodiment is not equipped with an internal combustion engine and is configured to rotate the rear wheel 3 by using driving power generated by the electric motor 5.

The front wheel 2 is rotatably mounted to the lower portion of a front fork 6 extending substantially vertically. A steering shaft 7 for steering the front wheel is coupled to the upper portion of the front fork 6, and a handle 8 is attached to the upper portion of the steering shaft 7.

The vehicle body frame 4 includes a head pipe 11 and a pair of right and left main frames 12. The steering shaft 7 is supported by the head pipe 11 such that the steering shaft 7 is rotatable. The main frames 12 are unitarily joined to the head pipe 11. The main frames 12 include down frame members 13 extending downward from the head pipe 11 and lower frame members 14 extending rearward from the lower ends of the down frame members 13. In the present embodiment, each of the lower frame members 14 extends substantially horizontally and is bent at a substantially right angle in a location at which the lower end portion of the down frame member 13 and the front end portion of the lower frame member 14 are connected to each other.

The rear end portions of the lower frame members 14 are detachably joined to a motor case 15 for accommodating the electric motor 5. For example, the rear end portions of the lower frame members 14 are detachably joined to the motor case 15 by bolts. A swing arm 16 is coupled to the motor case 15. The swing arm 16 extends substantially in a forward and rearward direction. The swing arm 16 is pivotally coupled at its front end portion to the motor case 15 and supports the rear wheel 3 by its rear end portion such that the rear wheel 3 is rotatable. The motor case 15 has a flange protruding rearward from the rear lower portion thereof. A pivot 17 around which the swing arm 16 is pivotable is oriented in a rightward and leftward direction so as to penetrate the flange. In this way, in the present embodiment, the motor case 15 is coupled to the main frames 12 of the vehicle body frame 4 and to the front end portion of the swing arm 16 and serves as a swing arm bracket for coupling the swing arm 16. Since the motor case is utilized as a swing arm bracket, the number of components can be reduced.

A link mechanism 18 which operates in response to the pivot motion of the swing arm is provided between the lower portion of the swing arm 16 and the bottom portion of the motor case 15. The lower end portion of a rear suspension 19 is coupled to the link mechanism 18 such that the rear suspension 19 is pivotable. The upper end portion of the rear suspension 19 is coupled to the rear portion of the motor case 15 such that the rear suspension 19 is pivotable. In this way, the motor case 15 also serves as a fastening suspension bracket for mounting the end of the rear suspension 19 to the vehicle body.

The motor case 15 is also joined to a seat frame 20. The seat frame 20 is detachably joined to the motor case 15 (not shown in FIG. 2), and extends rearward from the upper portion of the motor case 15 such that it is inclined upward. A seat 9 on which the rider and a passenger are seated in the forward and rearward direction is mounted to the seat frame 20. The electric motorcycle is a straddle vehicle. The rider is seated on the seat 9 while straddling the vehicle body.

As described above, the driving power source is the electric motor 5. Therefore, the electric motorcycle 1 incorporates a battery unit 21 as an electric power supply for the electric motor 5. The battery unit 21 includes a battery 22 for storing DC power, and a battery case 23 accommodating the battery. The battery case 23 is supported on the lower frame members 14. The upper portion of the battery case 23 is covered with an air box 35. An intake duct 36 is attached to the upper portion of the battery case 23. A discharge duct 37 is coupled to an outlet 23a (see FIG. 2) formed in the rear wall of the battery case 23. The intake duct 36 and the discharge duct 37 open in the interior of the air box 35. The air box 35 is able to take in ram air from forward. The air taken into the air box 35 is sent to the battery case 23 via the intake duct 36, flows rearward in the interior of the battery case 23 and is discharged to the interior of the air box 35 via the discharge duct 37. This allows the battery 22 inside the battery case 23 to be suitably cooled by the air. Even when the ram air contains a moisture, the moisture can be captured in the interior of the air box 35, which makes it possible to suppress ingress of the moisture into the battery case 23. The internal space of the air box 35 can be utilized as a space in which electric components 38 are placed. By protruding a terminal 39 connected to the battery 22 from the upper portion of the battery case 23, the electric components 38 inside the air box 35 can be easily connected to the battery 22, which provides an advantage.

An inverter (not shown) converts the DC power stored in the battery 22 into AC power. The electric motor 5 is activated by the AC power supplied from the inverter to generate the driving power for moving the vehicle body. The driving power generated by the electric motor 5 is transmitted to the rear wheel 3 via a driving power transmission mechanism 24. This allows the rear wheel 3 to rotate. As a result, the electric motorcycle 1 can drive.

The driving power transmission mechanism 24 includes a transmission 25 and a chain 26. The transmission 25 is able to select its change gear ratio from among a plurality of change gear ratios, and to change the speed of the rotation of an output shaft of the electric motor 5 with the selected change gear ratio. The transmission 25 may be, for example, a multistage constant-mesh manual transmission including a dog clutch. Or, the transmission 25 may be a gearless transmission or an automatic transmission. The chain 26 serves to transmit to the rear wheel the rotation whose speed has been changed by the transmission 25. In the present embodiment, the motor case 15 accommodates the transmission 25 together with the electric motor 5. The electric motor 5 and the transmission 25 are arranged in the vertical direction. Although in FIG. 1, a case where the electric motor 5 is positioned above the transmission 25 is exemplarily shown, it may be positioned below the transmission 25.

Since the motor case 15 accommodates the electric motor 5 and the transmission 25, the motor case 15 is increased in size in a direction in which the electric motor 5 and the transmission 25 are arranged. In the present embodiment, the electric motor 5 and the transmission 25 are arranged vertically, and as a result, the motor case 15 is placed so as to extend vertically. The rear end portion of the lower frame member 14 is coupled to the front lower portion of the motor case 15. The pivot 17 is provided at the rear lower portion of the motor case 15, while the lower frame members 14 are positioned below the pivot 17. The bottom portion of the motor case 15 constitutes an oil pan 27 for reserving oil. The oil is utilized as a coolant for cooling the electric motor 5 and as a lubricant for lubricating sliding sections of the transmission 25. The motor case 15 accommodates an oil pump 28 which discharges the oil reserved in the oil pan 27. The oil pump 28 is placed below the transmission 25 and above the oil pan 27.

Sub-frames 30 are placed above the main frames 12. Although the main frames 12 are composed of the pair of right and left main frames and the sub-frames 30 are composed of a pair of right and left sub-frames, only the right main frame 12 and the right sub-frame 30 are shown in FIG. 1. The sub-frames 30 extend rearward from the upper portions of the main frames 12 and are provided and connected between the front side of the vehicle body frame 4 and the rear side of the vehicle body frame 4. Specifically, each of the sub-frames 30 includes a first frame member 31 for coupling the upper end portion of the down frame member 13 to the front upper portion of the motor case 15 and a second frame member 32 for coupling the first frame member to the vertically intermediate portion of the down frame member 13. The sub-frames 30 can increase a stiffness of the vehicle body.

The second frame member 32 is unitarily welded to the first frame member 31. Each of the sub-frames 30 is detachably joined to the vehicle body frame 4. Specifically, the front end portion of the first frame member 31 is detachably joined to the upper end portion of the down frame member 13 by a bolt. The rear end portion of the first frame member 31 is detachably joined to the upper portion of the motor case 15 by a bolt. The lower end portion of the second frame member 32 is detachably joined to the vertically intermediate portion of the down frame member 13. Since the sub-frames 30 are detachable from the vehicle body frame 4 in this way, the battery unit 21 can be easily mounted in the vehicle as will be described below.

Figure 2:
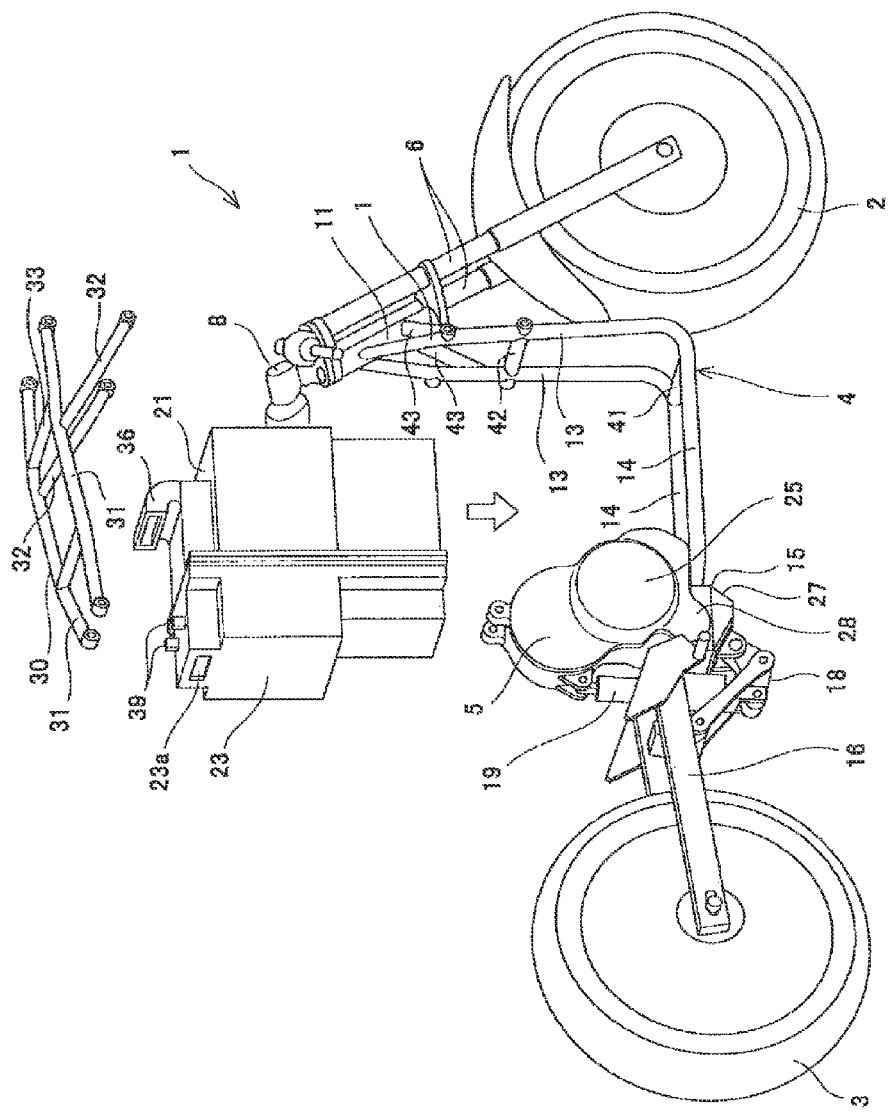
FIG. 2 is an exploded perspective view of components of the straddle electric vehicle of FIG. 1.

FIG. 2 is an exploded perspective view of components of the electric vehicle 1 of FIG. 1. In assembling of the electric motorcycle 1, firstly, in a state in which the sub-frames 30 are detached from the vehicle body frame 4, the components of the front wheel 2 side are mounted to the head pipe 11, and the rear end portions of the lower frame members 14 are joined to the motor case 15. By mounting the swing arm 16 and the rear wheel 3 to the motor case 15 at this point, the vehicle body frame 4 can be easily mounted to the rear wheel 3 side.

Thereafter, in the step of mounting the battery unit 21, the sub-frames 30 (see FIG. 1) remain detached from the vehicle body frame 4. In this state, the battery unit 21 is placed on the lower frame members 14 of the main frames 12. By merely placing the battery unit 21 on the lower frame members 14, the battery unit 21 can be mounted in the vehicle. Unlike with the conventional vehicle body frame structure, it is not necessary to raise the battery unit 21 to a high position. What is needed is to raise the bottom portion of the battery unit 21 to a position which is higher than the motor case 15. This makes it possible to easily carry out a work for mounting the battery unit 21 with a heavy weight in the vehicle. In the present embodiment, the lower frame members 14 are positioned below the pivot 17 attached to the motor case 15 which serves as the swing arm bracket. This allows the battery unit 21 to be placed on the lower frame members 14 without a need to raise the battery unit 21 to a high position. As a result, a work for mounting the battery unit 21 in the vehicle can be easily carried out.

The lower frame members 14 are composed of a pair of right and left lower frame members. The bottom portion of the battery unit 21 is placed over the right and left lower frame members 14. In this way, the battery unit 21 can be stably supported by the lower frame members 14. The down frame members 13 are placed between the battery unit 21 and the front wheel 2. This allows the front portion of the battery unit 21 to be protected by the down frame members 13.

Then, the sub-frames 30 are joined to the vehicle body frame 4. The sub-frames 30 further include a front cross member 33 and a rear cross member 34 in addition to the pair of right and left first frame members 31 and the pair of right and left second frame members 32, although the front cross member 33 and the rear cross member 34 are not shown in FIG. 1. The front cross member 33 and the rear cross member 34 extend in the rightward and leftward direction and couple the pair of right and left first frame members 31 to each other. The front cross member 33 couples the pair of right and left first frame members 31 to each other, in the vicinity of the base end portions of the second frame members 32. The rear cross member 34 is placed rearward relative to the front cross member 33. Thus, the sub-frames 30 have the cross members 33, 34 at the front and at the rear, respectively, to provide a unitary construction in the rightward and leftward direction.

To allow the sub-frames 30 to be mounted in the vehicle, the sub-frames 30 are configured to be mounted from above into the vehicle body frame with respect to the battery case 23 supported on the main frames 12. Specifically, the first frame members 31 and the second frame members 32 are placed outward relative to the battery unit 21 in a vehicle width direction such that they cover the side portions of the battery unit 21. In this state, the first frame members 31 and the second frame members 32 are joined to the main frames 12 and the motor case 15 by bolts and other members.

Since the first frame members 31 and the second frame members 32 cover the side portions of the battery case 23, the front cross member 33 is placed forward relative to the front wall of the battery case 23 and the rear cross member 34 is placed rearward relative to the rear wall of the battery case 23, in a state in which the sub-frames 30 are fastened to the vehicle body frame 4. Since the front cross member 33 and the rear cross member 34 sandwich the battery case 23 in the forward and rearward direction in a state in which the sub-frames 30 are fastened to the vehicle body frame 4, as described above, it becomes possible to protect the battery case 23, and suppress the battery case 23 from being displaced in the forward and rearward direction, with respect to the vehicle body. The front wall of the upper end portion of the battery case 23 is offset rearward, so as to form a space in which the front cross member 33 is placed. This allows the second frame members 32 to cover the side portions of the battery case 23.

Since the sub-frames 30 extend outward relative to the battery unit 21 in the vehicle width direction, they serve as protective members for protecting the battery unit 21 when the vehicle body falls down laterally. Especially, since the sub-frames 30 can protect the upper portion of the battery unit 21, a portion of the battery unit 21 which is more likely to be damaged due to an increased angular velocity when the vehicle body falls down in a standing state can be protected more effectively. Since the sub-frames 30 are mounted from above into the vehicle body frame with respect to the battery case 23 and cover the upper portion of the battery case 23, the dimension of the lower portion of the battery case 23 in the rightward and leftward direction is not restricted by the spacing between the right and left sub-frames 30, even though the sub-frames 30 have a unitary structure in the rightward and leftward direction. This can increase the dimension of the lower portion of the battery case 23, and achieve an increase in the capacity of the battery 22 and a lowered center of gravity of the vehicle.

The sub-frame 30 at one (e.g., left side) of the right and left sides is joined to the main frame 12 at one side (e.g., left side). The sub-frame 30 at the other side (e.g., left side) is joined to the main frame 12 at the other side (e.g., left side). Since the right and left sub-frames 30 are joined to the right and left main frames 12 which face the right and left sub-frames 30, respectively, as described above, the length of the sub-frames 30 can be made shorter than in a case where the sub-frames 30 are joined to the head pipe 11.

The rear end portions of the lower frame members 14 are connected to the front portion of the motor case 15. The rear end portions of the sub-frames 30 are connected to the front portion of the motor case 15. The battery unit 21 is accommodated into the space surrounded by the main frames 12, the sub-frame 30 and the motor case 15. In this construction, since the motor case 15 serves as a portion of the vehicle body frame 4, the number of components can be reduced, and the space in which the battery unit 21 is placed can be expanded.

The right and left sub-frames 30 are detachably joined to the upper portion of the motor case 15. As described above, the motor case 15 is placed so as to extend vertically. Therefore, each of the rear end portions of the sub-frames 30 can be made vertically distant from the rear end portions of the lower frame members 14. This eliminates a need to extend the rear end portions of the sub-frames 30 such that they are inclined downward to be close to the lower frame members 14, respectively. Therefore, the sub-frames 30 can be reduced in length. In addition, it is not necessary to bend upward the rear end portions of the lower frame members 14. In this way, the portion of the lower frame members 14 which support the battery unit 21 can be increased in dimension in the forward and rearward direction.

The lower frame members 14 of the main frames 12 bear most of the weight of the battery unit 21. Because of this, the sub-frames 30 need not have a stiffness sufficient to bear the battery unit 21. Since it is not necessary to increase the stiffness of the sub-frames 30, the sub-frames 30 can be designed more flexibly. For example, the sub-frames may be designed so as to provide an improved external appearance rather than a high stiffness for bearing the battery unit 21. The side surfaces of the vehicle body which are more likely to affect the external appearance of the vehicle body can be designed in various ways. The sub-frames 30 are positioned above the lower frame members 14 of the main frames 12. Since the down frame members 13 and the lower frame members 14 of the main frames 12 have a unitary structure, it becomes easier to ensure the stiffness sufficient for bearing the battery 22. Since the battery 22 and the electric motor 5 are mounted together onto the lower frame members 14, the center of gravity of the vehicle can be made lower, than in a case where the battery 22 is placed above the electric motor 5. In addition, in this construction, it becomes possible to avoid the electric motor 5 from contacting obstacles on the road surface and hence protect the electric motor 5 from the obstacles by the lower frame members 14, as compared to a case where the electric motor 5 is placed below the lower frame members 14.

Alternatively, the side portions of the battery unit 21 may be fastened to the sub-frames 30. In this case, the sub-frames 30 can also bear the load of the battery unit 21, and the load applied to the vehicle body frame 4 can be lessened. In addition, it becomes possible to prevent the battery unit 21 from being displaced in the rightward and leftward direction, and as a result, a weight balance of the vehicle can be stabilized during driving.

As shown in FIG. 2, in the present embodiment, the lower frame members 14 of the main frames 12 are composed of the pair of right and left frame members, and the down frame members 13 of the main frames 12 are also composed of the pair of right and left frame members. A cross member 41 is provided to connect the right and left bent portions formed between the front end portions of the down frame members 13 and the front end portions of the lower frame members 14. This can enhance a stiffness of the bent portions. The down frame members 13 extend substantially vertically, the lower frame members 14 extend substantially horizontally, and the bent portions have a substantially right angle. In this construction, when viewed from a side, the front lower portion of the main frame 12, which is bent at a substantially right angle, forms a wide space, in which the battery unit 21 of a large size can be placed efficiently. In addition, the frames can firmly bear the heavy weight of the battery unit 21 from below.

The second frame members 32 (see FIG. 1) are mounted to the vertically intermediate portions of the down frame members 13, respectively. A cross member 42 is provided at portions of the down frame members 13 to which the tip end portions of the second frame members 32 are joined, respectively. This can enhance a stiffness of the down frame members 13 and the cross member 41. In addition, the cross member 42 can receive the load applied by the sub-frames 30 to the main frames 12, and the sub-frames 30 can be stably joined to the main frames 12. The sub-frames 30 include a front cross member 33 for coupling the portions in the vicinity of the base end portions of the second frame members 32. As described above, since the right and left base end portions of the pair of second frame members 32 are coupled together by the cross member 33, and the right and left tip end portions of the pair of second frame members 32 are coupled together by the cross member 42, the stiffness of the second frame members 32 can be enhanced.

The vehicle body frame 4 is provided with reinforcement frames 43. Each of the reinforcement frames 43 extends upward from the portion of the down frame member 13 which is joined to the second frame member 32 such that the reinforcement member 43 is inclined forward and is joined to the head pipe 11. The reinforcement frames 43 can further enhance the stiffness of the vehicle body frame 4, and hence the lower frame members 14 can bear the battery unit 21 with a heavy weight. The upper end portions of the down frame members 13 are joined to the upper portion of the head pipe 11, while the upper end portions of the reinforcement frames 43 are joined to the lower portion of the head pipe 11. In this structure, the sub-frames 30 are joined to the main frames 12 rather than the head pipe 11. Because of this, the structure in the vicinity of the head pipe 11 does not become complex, and installation work and wiring work of gauges can be easily carried out.

The front portion of the battery case 23 is protected by the down frame members 13 and the front cross member 33. The rear portion of the battery case 23 is protected by the motor case 15 and the rear cross member 34. The side portions of the battery case 23 are protected by the first and second frame members 31, 32. This makes it possible to prevent the battery from being displaced from the vehicle body even when an abrupt impact is generated due to rapid deceleration or collision.

The electric motor 5 is placed forward relative to the seat 9 such that the electric motor 5 faces the seat 9. Therefore, as compared to a case where the battery unit 21 is placed in front of and in close proximity to the seat 9, the dimension of a portion of the vehicle body in the vehicle width direction, which portion is forward relative to the seat 9, can be reduced. This allows the rider to easily grip the vehicle body with knees. Therefore, the rider can easily drive the electric motorcycle 1.

Figure 3:
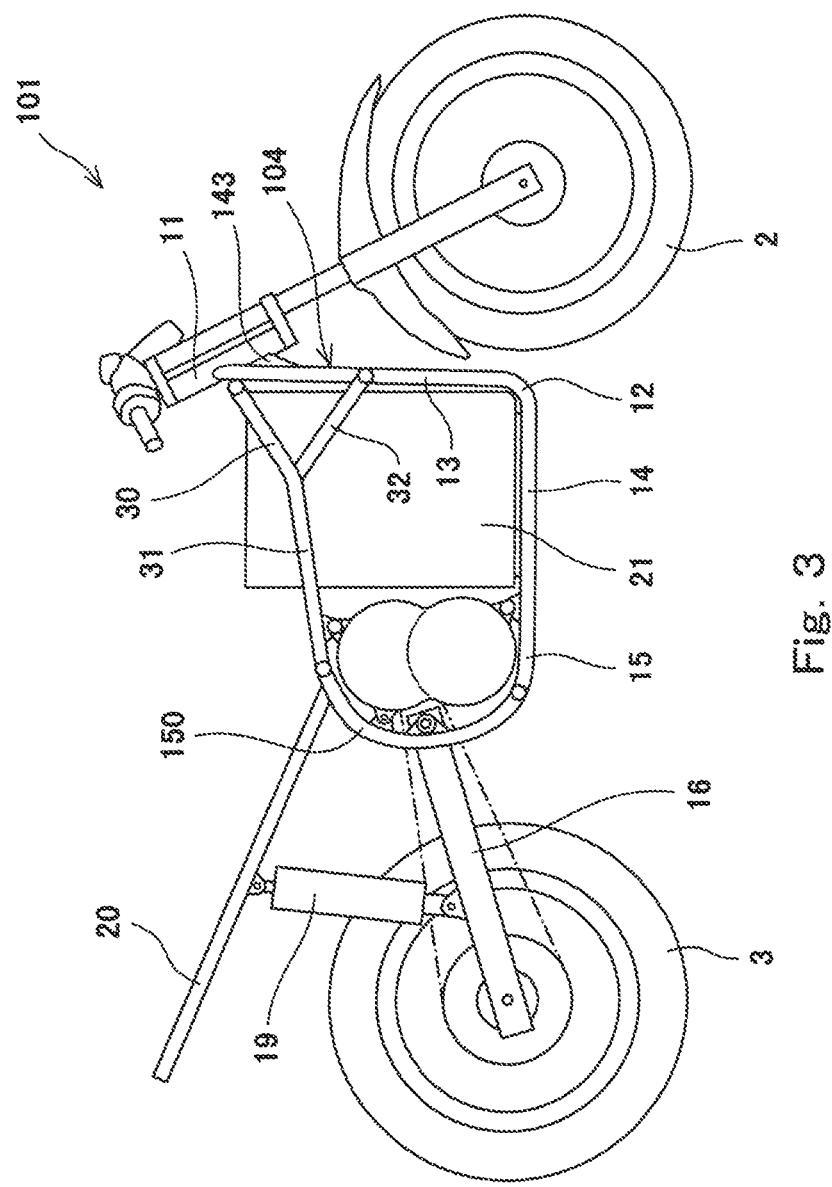
FIG. 3 is a right side view of an electric motorcycle which is an exemplary straddle electric vehicle according to Embodiment 2 of the present invention.

FIG. 3 is a right side view of an electric motorcycle which is an exemplary straddle electric vehicle according to Embodiment 2 of the present invention. Hereinafter, regarding Embodiment 2, differences from Embodiment 1 will be mainly described. As shown in FIG. 3, an electric motorcycle 101 of the present embodiment is configured such that a motor case 115 is supported on the main frames 12, and does not serve as a suspension bracket and as a swing arm bracket.

As in Embodiment 1, the main frames 12 include the pair of right and left down frame members 13 and the pair of right and left lower frame members 14. The battery unit 21 is supported on the lower frame members 14. The vehicle body frame 104 is provided with reinforcement plates 143 welded to the down frame members 13 and the head pipe 11. This allows the stiffness of the vehicle body frame 104 to be improved, and the battery unit 21 to be stably supported. Each of the sub-frames 30 includes the first frame member 31 extending rearward from the upper end portion of the down frame member 13 such that the first frame member 31 is inclined downward, and the second frame member 32 for coupling the first frame member 31 to the vertically intermediate portion of the down frame member 13.

The electric motorcycle 101 includes swing arm brackets 150 for connecting the rear end portions of the main frames 12 to the rear end portions of the first frame members 31, respectively. The swing arm brackets 150 extend substantially vertically. The lower portion of the motor case 115 is coupled to the lower frame members 14, the upper portion of the motor case 115 is coupled to the first frame members 31, and the rear portion of the motor case 115 is coupled to the swing arm brackets 150. The front end portions of the swing arm 16 are coupled to the swing arm brackets 150 such that the swing arm 16 is pivotable. The seat frame 20 extends rearward from the swing arm brackets 150. The rear suspension 19 is provided between the seat frame 20 and the swing arm 16 so as to couple the seat frame 20 and the swing arm 16 to each other.

In the present embodiment, also, the sub-frames 30 are detachably joined to a vehicle body frame 104. Specifically, the front end portions of the first frame members 31 are detachably joined to the upper end portions of the down frame members 13, respectively, by bolts. The rear end portions of the first frame members 31 are detachably joined to the upper end portions of the swing arm brackets 150, respectively, by bolts. The lower end portions of the second frame members 32 are detachably joined to the vertically intermediate portions of the down frame members 13, respectively, by bolts. Since the sub-frame members 30 are joined to the vehicle body frame 104, the battery unit 21 can be easily mounted to the vehicle as in Embodiment 1. In addition, since the battery case 23 is covered laterally, the battery can be protected more effectively when a collision takes place.

Alternatively, as an intermediate frame structure between Embodiment 1 and Embodiment 2, the swing arm brackets may be unitarily mounted to the rear end portions of the lower frame members such that the pivots are provided at the main frames, and the motor unit may be constructed separately from the swing arm brackets. This allows only the electric motor to be detached in a state in which the front and rear wheels are joined to the main frames, which makes the maintenance work easier. In this case, the rear suspension may be mounted to the motor unit, and the motor case may serve as the suspension bracket.

Figure 4:
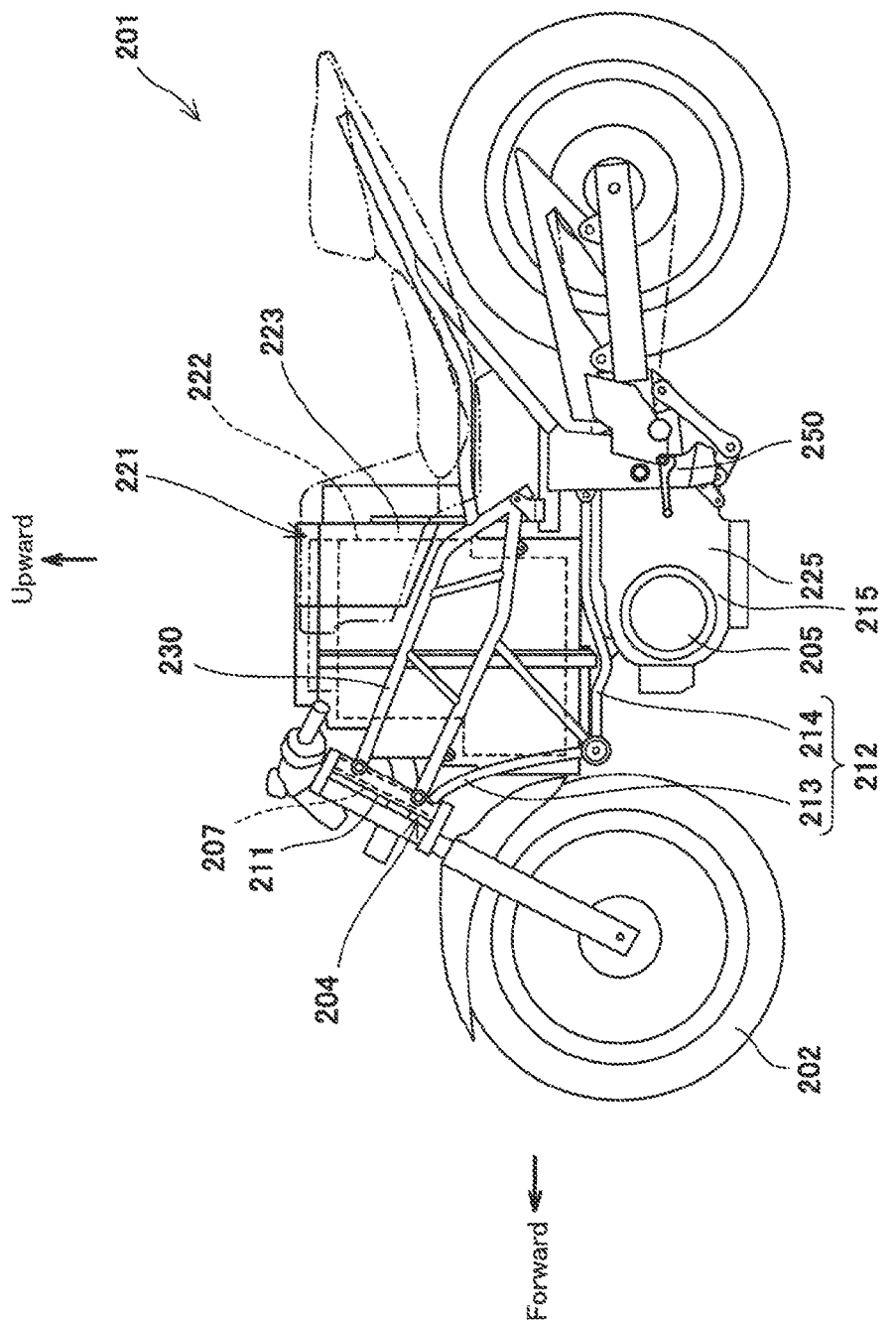
FIG. 4 is a left side view of an electric motorcycle which is an exemplary straddle electric vehicle according to Embodiment 3 of the present invention.

FIG. 4 is a left side view of an electric motorcycle 201 which is an exemplary straddle electric vehicle according to Embodiment 3 of the present invention. As shown FIG. 4, in the electric motorcycle 201, a motor case 215 accommodates an electric motor 205 and a transmission 225 and is placed to extend in the forward and rearward direction. A vehicle body frame 204 includes a head pipe 211 and main frames 212. A steering shaft 207 for changing the direction of a front wheel 202 is rotatably supported by the head pipe 211. The main frames 212 are fastened to the head pipe 211. The main frames 212 include down frame members 213 extending substantially downward from the head pipe 212 and lower frame members 214 extending substantially rearward from the lower end portions of the down frame members 213, respectively. The motor case 215 is supported on the lower frame members 214 and positioned below the lower frame members 214. The rear end portions of the lower frame members 214 are detachably joined to the upper front end portions of swing arm brackets 250, respectively, by bolts. Alternatively, the front end portions of the lower frame members 214 may be detachably joined to the lower end portions of the down frame members 213, respectively, by bolts.

The electric motorcycle 201 includes sub-frames 230 extending rearward from the upper portions of the main frames 212, respectively. The sub-frames 230 are composed of a pair of right and left sub-frames and a pair of upper and lower sub-frames. The front end portions of the sub-frames 230 are detachably joined to the head pipe 211 by bolts, while the rear end portions of the sub-frames 230 are detachably joined to the upper portions of the swing arm brackets 250, respectively. In this way, the sub-frames 230 are detachably joined to a vehicle body frame 204. A battery unit 221 includes a battery 222 which is an electric power supply for the electric motor 205, and a battery case 223 for accommodating the battery 222. The bottom portion of the battery unit 221 is supported on the lower frame members 214 of the main frames 212. The pair of right and left sub-frames 230 cover the left side portion and right side portion of the battery unit 221, respectively.

Since the lower frame members 214 of the main frames 212 are detachable from the down frame members 213, as well as the sub-frames 230 as described above, the battery unit 221 can be mounted in the vehicle more easily. In addition, a mounting error between the lower frame members 214 and the motor case 215 can be reduced. Moreover, since the motor case 215 is placed below the lower frame members 214, the motor case 215 can be suitably cooled by the air.

Thus far, the embodiments of the present invention have been described above. The above described configuration can be suitably changed. For example, the sub-frames 30 are not limited to those which include the cross members 33, 34 to provide a unitary structure in the rightward and leftward direction, and may be configured such that the first and second frame members 31, 32 at the left side are separate from the first and second frame members 31, 32 at the right side. In the case where the first and second frame members 31, 32 at the left side are separate from the first and second frame members 31, 32 at the right side, only the first and second frame members 31, 32 at the left side or the right side may be detachably joined to other frame members. Moreover, the sub-frame members 30 need not be composed of the pair of right and left frame members.

The sub-frames 30 may be detachably joined to the main frames 12, and may be detachably joined to the electric motor 5 by using a joining structure other than the bolts, so long as they are detachably joined to each other. For example, the sub-frames 30 may be detachably joined to the main frames 12, and may be detachably joined to the electric motor 5 by using pins or wedges. Although in the present embodiment, the right and left sub-frames 30 are detachable from the main frames 12, respectively, only one of the right and left sub-frames 30 may be detachable from the main frame 12. In this structure, also, the same advantages can be achieved. For example, in a case where the vehicle body stands such that it is inclined at one of either the right or left side by a stand device, the sub-frame 30 at the other side may be detachable from the main frame 12. In this structure, even when a part of the weight of the battery 22 is applied to the sub-frames 30 during a stop of the electric motorcycle 1 in an inclined state, a sufficient stiffness can be ensured because the sub-frame 30 and the main frame 12 are unitarily molded.

Or, the transmission 25 may not be incorporated into the electric motorcycle 1. By placing the electric motor 5 above the pivot 17 and the battery in front of the electric motor 5, the motor case 15 can be utilized as a portion of the swing arm bracket as in Embodiment 1. Thus, the number of components can be reduced.

Although the electric motorcycle has been exemplarily described as the straddle electric vehicle according to the embodiments of the present invention, the present invention is also applicable to other vehicles such as an all terrain vehicle (ATV), or a straddle three-wheeled vehicle. Although the vehicle which does not include an internal combustion engine and drives only by using the driving power generated by the electric motor is exemplarily described as the electric vehicle, the present invention is also applicable to a hybrid vehicle including the internal combustion engine in addition to the electric moor.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention has the advantages that it is easy to increase the capacity of the battery, and to easily and stably mount the battery of a large size, and that it is effectively applicable to straddle electric vehicles such as an electric motorcycle.

The invention claimed is:

1. A straddle electric vehicle which drives by use of driving power generated by an electric motor, the straddle electric vehicle comprising:
   a battery unit which is an electric power supply for the electric motor;
   a vehicle body frame including a head pipe supporting a steering shaft for steering a front wheel such that the steering shaft is rotatable, and a main frame unitarily joined to the head pipe; and
   a sub-frame extending rearward from an upper portion of the main frame;
   wherein the main frame includes a down frame member extending downward from the head pipe and a lower frame member extending rearward from a lower end of the down frame member, and the sub-frame is detachably joined to the vehicle body frame by use of a bolt;
   wherein a bottom portion of the battery unit is supported on the lower frame member of the main frame, and a side portion of the battery unit is covered with the sub-frame;
   wherein at least the lower frame member of the main frame is composed of a pair of right and left lower frame members; and
   wherein the bottom portion of the battery unit is supported on the pair of right and left lower frame members.

2. The straddle electric vehicle according to claim 1, wherein the down frame member is placed forward relative to the battery unit.

3. The straddle electric vehicle according to claim 1, wherein the main frame includes a pair of right and left main frames, and the sub-frame includes a pair of right and left sub-frames; and
   wherein the right and left sub-frames are detachably joined to the right and left main frames facing the right and left sub-frames, respectively.

4. The straddle electric vehicle according to claim 1, comprising:
   a swing arm supporting a rear wheel such that the rear wheel is rotatable; and
   a swing arm bracket coupled to the swing arm such that the swing arm is pivotable;
   wherein the lower frame member and the sub-frame are detachably joined to the swing arm bracket.

5. A straddle electric vehicle which drives by use of driving power generated by an electric motor, the straddle electric vehicle comprising:
   a battery unit which is an electric power supply for the electric motor;

a vehicle body frame including a head pipe supporting a steering shaft for steering a front wheel such that the steering shaft is rotatable, and a main frame unitarily joined to the head pipe; and a sub-frame extending rearward from an upper portion of the main frame;

a motor case accommodating the electric motor;

a swing arm supporting a rear wheel such that the rear wheel is rotatable; and a swing arm bracket coupled to the swing arm such that the swing arm is pivotable;

wherein the main frame includes a down frame member extending downward from the head pipe and a lower frame member extending rearward from a lower end of the down frame member, and the sub-frame is detachably joined to the vehicle body frame;

wherein a bottom portion of the battery unit is supported on the lower frame member of the main frame, and a side portion of the battery unit is covered with the sub-frame;

wherein the swing arm bracket is formed by at least a portion of the motor case; and wherein a rear end portion of the lower frame member and a rear end portion of the sub-frame are detachably joined to the swing arm bracket formed by the portion of the motor case.

6. The straddle electric vehicle according to claim 5, comprising:

a transmission for changing a speed of a rotation of the electric motor;

wherein the motor case accommodates the transmission and the electric motor; and wherein the electric motor and the transmission are arranged vertically.

7. A straddle electric vehicle which drives by use of driving power generated by an electric motor, the straddle electric vehicle comprising:

a battery unit which is an electric power supply for the electric motor;

a vehicle body frame including a head pipe supporting a steering shaft for steering a front wheel such that the steering shaft is rotatable, and a main frame unitarily joined to the head pipe; and a sub-frame extending rearward from an upper portion of the main frame, comprising:

a swing arm supporting a rear wheel such that the rear wheel is rotatable; and a swing arm bracket coupled to the swing arm such that the swing arm is pivotable;

wherein the main frame includes a down frame member extending downward from the head pipe and a lower frame member extending rearward from a lower end of the down frame member, and the sub-frame is detachably joined to the vehicle body frame by use of a bolt;

wherein a bottom portion of the battery unit is supported on the lower frame member of the main frame, and a side portion of the battery unit is covered with the sub-frame;

wherein the lower frame member and the sub-frame are detachably joined to the swine arm bracket; and wherein the lower frame member is located below a pivot around which the swing arm is pivoted with respect to the swing arm bracket.

8. A straddle electric vehicle which drives by driving power generated by an electric motor, the straddle electric vehicle comprising:

a battery unit which is an electric power supply for the electric motor;

a vehicle body frame including a head pipe supporting a steering shaft for steering a front wheel such that the steering shaft is rotatable, and a main frame unitarily joined to the head pipe;

a sub-frame which is detachably joined to the vehicle body frame by use of a detachable joining structure and provided between a front side of the vehicle body frame and a rear side of the vehicle body frame to couple the front side and the rear side;

wherein the main frame includes a down frame member extending downward from the head pipe and a lower frame member extending rearward from a lower end of the down frame member, wherein a bottom portion of the battery unit is supported on the lower frame member of the main frame, and a side portion of the battery unit is covered with the sub-frame; and wherein the sub-frame includes a left frame member and a right frame member, and only one of the left frame member and the right frame member is detachably joined to the vehicle body frame by use of the joining structure.

9. The straddle electric vehicle according to claim 8, comprising:

a stand device which inclines the vehicle body at one of right and left sides in a stopped state of the vehicle body;

wherein one of the left frame member and the right frame member is located at a side which is opposite to the right side or the left side at which the vehicle body is inclined by the stand device.

10. The straddle electric vehicle according to claim 8, wherein the sub-frame includes a left frame member, a right frame member, and a cross member coupling the left frame member to the right frame member.

11. The straddle electric vehicle according to claim 8, wherein the joining structure includes a bolt, a pin, or a wedge.

12. The straddle electric vehicle according to claim 8, wherein the joining structure is provided at front and rear end portions of the sub-frame.

* * * * *

UNITED STATES PATENT AND TRADEMARK OFFICE
CERTIFICATE OF CORRECTION

PATENT NO. : 9,238,495 B2
APPLICATION NO. : 14/369178
DATED : January 19, 2016
INVENTOR(S) : Yoshimoto Matsuda It is certified that error appears in the above-identified patent and that said Letters Patent is hereby corrected as shown below:

In the claims, column 14, line 5, claim 7, delete "swine" and insert --swing--.

Signed and Sealed this
Twelfth Day of April, 2016

Michelle K. Lee
*Director of the United States Patent and Trademark Office*